Aug. 4, 1931.  O. J. HOWE  1,817,411
STOCKING TREE
Filed Feb. 21, 1930
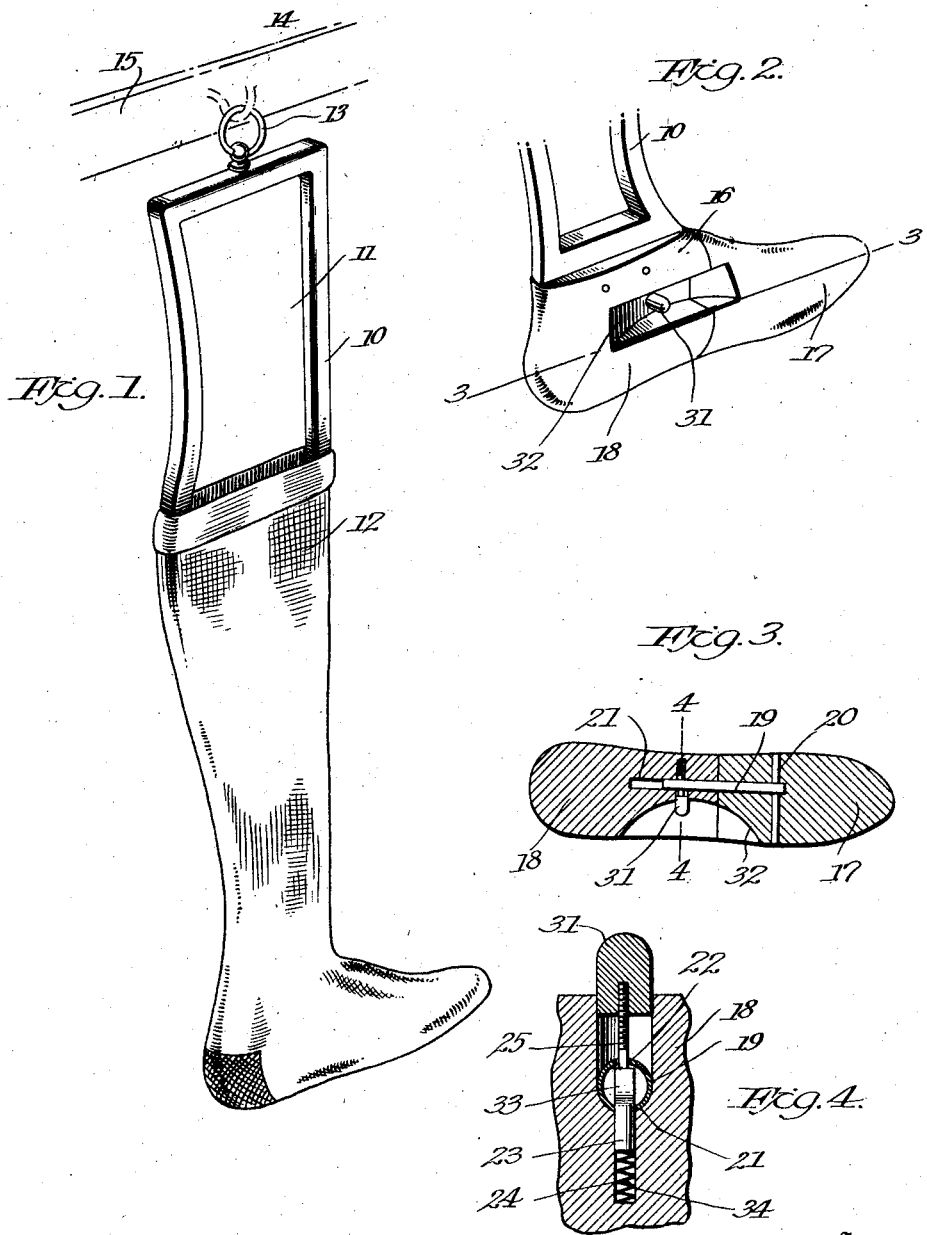
Inventor
Oliver J. Howe
By Cushman, Bryant & Darby
Attorneys Patented Aug. 4, 1931

1,817,411

UNITED STATES PATENT OFFICE

OLIVER J. HOWE, OF BROCKTON, MASSACHUSETTS, ASSIGNOR TO DANIEL C. REBHUN, OF CINCINNATI, OHIO, A CORPORATION OF OHIO

STOCKING TREE

Original application filed March 23, 1929, Serial No. 349,462. Patent No. 1,770,925, dated July 22, 1930. Divided and this application filed February 21, 1930. Serial No. 430,370.

The present invention relates to stocking trees or driers and more particularly to an improved means for facilitating the drying of stockings of various sizes and is a division, under official requirement, of my application Serial No. 349,462, filed March 23, 1929, patented July 22, 1930, No. 1,770,925.

As is well known, men's, women's and children's hosiery are generally divided into three classes or groups in each of which the leg portion is of substantially the same length and width while the foot portion in each may vary as to size.

A primary object of the present invention is to provide a stocking tree or drier with an adjustable foot portion, so as to permit the drier to be inserted and properly fit in stockings whose leg portions are substantially the same dimensions, but whose foot portions are of different lengths.

A further object comprehends the provision of a stocking tree having its foot portion formed with a toe section and a heel section adjustable relative to each other, and means associated with the sections for maintaining them in a predetermined position, which means is arranged so as not to interfere with the inserting or the removing of the stocking from the tree.

Further objects and advantages will become apparent from the following description, when taken in conjunction with the accompanying claim and drawings.

In the drawings, in which is shown a preferred embodiment of the invention,

Figure 1 is a perspective view showing the stocking tree supported in its drying position.

Figure 2 is a perspective view of the toe portion with the stocking removed therefrom.

Figure 3 is a sectional view taken substantially along the line 3—3 of Figure 2.

Figure 4 is an enlarged sectional view taken substantially along the line 4—4 of Figure 3.

Referring to the drawings, in which like numerals indicate like parts in the several views, 10 denotes a stocking tree or drier, the leg portion of which preferably has an elongated opening 11 for facilitating the drying of a stocking such as 12, when the latter is placed on the drier. In order to facilitate the drying of the stocking, the tree 10 may have a ring member 13 secured thereto, which is arranged to be supported by a hook 14 attached to a rack or the like 15.

In order that the foot portion 16 of the stocking tree may properly engage different sizes of stockings whose leg portions are of substantially the same dimensions, the foot portion 16 is preferably composed of a toe section 17 and a separate heel section 18 that are arranged to be moved relative to each other through the instrumentality of the connecting bar 19 (Fig. 3), which is connected at one end to a pin 20, that extends transversely through the toe section 17 and has its opposite extremity longitudinally slidable in an opening 21 formed in the heel section 18. The connecting bar 19 is preferably of tubular form and is provided with diametrically disposed axial slots 21 and 22 through which extends a laterally disposed locking plunger 23, that is slidably mounted in a recess 24 (Fig. 4). The plunger 23 has a reduced threaded stem 25 that extends through the slot 22, so as to receive the handle 31 that projects into the recess 32 formed in one side of the foot portion 16. The plunger 23 between the ends thereof, is formed with laterally extending shoulders 33 which are normally arranged to be forced by the spring 34 into frictional engagement with the underside of the tubular bar 19 adjacent the slot 22, so as to lock the toe and heel sections in a predetermined position. It will be noted that the handle 31 which extends laterally from one side of the foot portion 16 is of such a length as not to project beyond the outer end of the recess 32 and thus will not interfere with the insertion or removal of a stocking from the tree.

It will be seen that normally the toe and heel sctions are maintained in locked position by reason of the engagement of the shoulder 33 with the underside of the tubular portion of the connecting bar 19. Upon moving the handle 31 inwardly against the pressure of the spring 34 the shoulder 33 is released from engagement with the connecting bar, so as to permit the sections to be moved relative to each other.

In operation the foot portion is first adjusted to the particular size of a stocking to be dried and the stocking is then placed on the tree 11, which, due to the shape and arrangement thereof, prevents shrinking of the stocking and facilitates its drying. Moreover, as the plunger 31 does not extend beyond the side of the foot portion 16, danger of tearing or otherwise injuring the stocking is eliminated.

It is to be understood that the form of the invention herewith shown and described is merely illustrative of a preferred embodiment and that such changes as fall within the purview of one skilled in the art may be made without departing from the spirit of the invention and the scope of the appended claim.

What I claim is:

A stocking tree having in combination a leg portion, a foot portion, means connecting said portions together, said foot portion having separate toe and heel sections, said sections provided with longitudinally aligned openings, a connecting bar mounted in said openings and secured to one of said sections, said tree having a recess in one side thereof, a laterally disposed locking plunger operatively connected to said bar and extending into said recess for permitting adjustment and maintaining the sections in predetermined adjusted positions relative to each other, said locking plunger being movable in a direction transverse of the plane of the stocking tree the exposed portion of said plunger lying wholly within said recess so as not to interfere with the inserting or removing of a stocking from the tree.

In testimony whereof I have hereunto set my hand.

OLIVER J. HOWE.